(12) United States Patent
Chou et al.

(10) Patent No.: US 6,856,121 B2
(45) Date of Patent: Feb. 15, 2005

(54) DIRECT VOLTAGE/DIRECT VOLTAGE CONVERTER

(75) Inventors: Chun-Yi Chou, Hsinchu (TW); Chao-chia Tsai, Changhua (TW); Wing-Kai Tang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 3 days.

(21) Appl. No.: 10/441,585

(22) Filed: May 19, 2003

(65) Prior Publication Data

US 2004/0160218 A1 Aug. 19, 2004

(30) Foreign Application Priority Data

Feb. 14, 2003 (TW) ........................................ 92103040 A

(51) Int. Cl.[7] ........................ G05F 1/656; G05F 1/613
(52) U.S. Cl. ........................ 323/222; 323/285

(58) Field of Search ........................ 323/222, 284, 323/282, 285, 290

(56) References Cited

U.S. PATENT DOCUMENTS

| | | | | | |
|---|---|---|---|---|---|
| 5,745,352 | A | * | 4/1998 | Sandri et al. | 363/41 |
| 6,366,070 | B1 | * | 4/2002 | Cooke et al. | 323/284 |
| 6,531,854 | B2 | * | 3/2003 | Hwang | 323/285 |
| 6,657,417 | B1 | * | 12/2003 | Hwang | 323/222 |

* cited by examiner

*Primary Examiner*—Bao Q. Vu
(74) *Attorney, Agent, or Firm*—J.C. Patents

(57) ABSTRACT

A direct voltage/direct voltage converter comprising a switch-shaping circuit, a voltage-sensing device and a control device is provided. The direct voltage/direct voltage converter has several running modes. Through the control device, one of the running modes is selected to serve as a current operating mode. According to the current operating mode, the control device issues a switching signal for turning the switch-shaping circuit on or off.

12 Claims, 8 Drawing Sheets

100

130

DIRECT VOLTAGE/DIRECT VOLTAGE CONVERTER

CROSS-REFERENCE TO RELATED APPLICATION

This application claims the priority benefit of Taiwan application serial no. 92103040, filed Feb. 14, 2003.

BACKGROUND OF THE INVENTION

1. Field of Invention

The present invention relates to a direct voltage converter. More particularly, the present invention relates to a timing control method of a direct voltage/direct voltage converter.

2. Description of Related Art

FIG. 5 is a circuit diagram of a conventional voltage mode pulse width modulation (PWM) direct voltage/direct voltage converter. The voltage mode PWM direct voltage/direct converter comprises a switch-rectifying circuit 500, a first resistor 514, a second resistor 516, a differential amplifier 524, a comparator 520, a triangular wave generator 522 and a driving device 518. As show in FIG. 5, the switch-rectifying circuit 500 has a switch for receiving an input voltage. Thereafter, the input voltage is shaped and filtered to produce an output voltage. The differential amplifier 524 amplifies the error voltage between the input voltage and a reference voltage. The comparator 520 compares the amplified error voltage with the output from the triangular wave generator 522 and outputs a driving signal to the driving device 518. Finally, the driving device 518 outputs a turning-on or switching-off signal to a switching device 510 inside the switch-rectifying circuit 500. Due to the deployment of an analogue modulation method to modulate the pulse width, this type of converter must incorporate analogue circuits including the triangular generator 522 and the differential amplifier 524. With these analogue devices, the converter is very sensitive to any process variation and the output voltage may deviate slightly from the target voltage.

FIG. 6 is a circuit diagram of a conventional current mode pulse width modulation (PWM) direct voltage/direct voltage converter. The current mode PWM direct voltage/direct voltage converter comprises a switch-rectifying circuit 500, a current monitoring circuit 512, a first resistor 514, a second resistor 516, a differential amplifier 524, a comparator 622, a flip-flop 618 and a pulse generator 620. As shown in FIG. 6, the switch-rectifying circuit 500 has a switch for receiving an input voltage. Thereafter, the input voltage is shaped and filtered to produce an output voltage. The differential amplifier 524 amplifies the error voltage between the input voltage and a reference voltage. The comparator 622 compares the amplified error voltage with the output from the current monitoring circuit 512 and outputs a signal to the flip-flop 618. According to the pulses received from the pulse generator 620 and the signal received from the comparator 622, the flip-flop 618 outputs a turning-on or a switching-off signal to a switching device 510 inside the switch-rectifying circuit 500. Due to the deployment of an analogue modulation method to modulate the pulse width, this type of converter must incorporate analogue circuits including the current monitoring circuit 512 and the differential amplifier 524. With these analogue devices, the converter has a rather complicated circuit layout and is very sensitive to any process variation. Furthermore, the output voltage may deviate slightly from the target voltage.

FIG. 7 is a circuit diagram of a conventional clock pulse frequency modulation (PFM) direct voltage/direct voltage converter. The clock PFM direct voltage/direct voltage converter comprises a switch-rectifying circuit 500, a first resistor 514, a comparator 722, an AND gate 718 and a square wave generator 720. As shown in FIG. 7, the switch-rectifying circuit 500 has a switch for receiving an input voltage. Thereafter, the input voltage is shaped and filtered to produce an output voltage. The comparator 722 compares the output voltage with a reference voltage and outputs a signal to the AND gate 718. According to the signal received from the square wave generator 720 and the comparator 722, the AND gate 718 outputs a turning-on or a switching-off signal to a switching device 510 inside the switch-rectifying circuit 500. Due to the setup of a fix pulse width in this type of converter, pulse width cannot be modulated according to the actual loading and hence the output voltage contains ripple. Moreover, the converter has little adaptive and feedback mechanisms as the loading changes. Thus, the converter is rather unsuitable to operate in an environment where loading changes are large. In addition, this type of converter is highly sensitive to slight variation in the inductance of any internal inductor. In other words, high cost inductors with very small variation in inductance value must be used.

FIG. 8 is a circuit diagram of a conventional current-limiting pulse frequency modulation (PFM) direct voltage/direct voltage converter. The current-limiting PFM direct voltage/direct voltage converter comprises a switch-rectifying circuit 500, a current monitoring circuit 512, a first resistor 514, a second resistor 516, a first comparator 822, a second comparator 820 and a S-R flip-flop 618. As shown in FIG. 8, the switch-rectifying circuit 500 has a switch for receiving an input voltage. Thereafter, the input voltage is shaped and filtered to produce an output voltage. The first comparator 822 compares the output voltage with a reference voltage and outputs a first signal to the S-R flip-flop 618. The second comparator 820 compares the voltage received from the current monitoring circuit 512 with a second reference voltage to output a second signal to the S-R flip-flop 618. According to the first signal and the second signal, the S-R flip-flop 618 outputs a turning-on or a switching-off signal to a switching device 510 inside the switch-rectifying circuit 500. Due to the deployment of a current monitoring circuit, the circuit of this type of converter is rather complicated and expensive to produce. Moreover, the current monitoring circuit tends to increase power consumption and hence this type of converter is unsuitable for driving a load with a large loading variation.

SUMMARY OF THE INVENTION

Accordingly, one object of the present invention is to provide a direct voltage/direct voltage converter that uses digital method to modulate pulse width and that the modulation is carried out dynamically following any variation in the loading attached to the converter. Ultimately, the converter is able to produce an output voltage very close to a preset target value.

To achieve these and other advantages and in accordance with the purpose of the invention, as embodied and broadly described herein, the invention provides a direct voltage/direct voltage converter. The converter comprises a switch-shaping circuit, a voltage-sensing device and a control device. The switch-shaping circuit has a switching device for receiving an input voltage. After switching the switching device on, the input voltage is shaped and then filtered to produce an output voltage. The voltage-sensing device picks up the output voltage from the switch-shaping circuit and performs a measurement of the output voltage to produce a sensing signal. The control device is coupled to the voltage-sensing device and the switch-shaping circuit. The control device provides several running modes. On receiving the sensing signal from the voltage-sensing device, the control device selects an operating mode according to the running modes. Thereafter, according to the current operating mode, the control device outputs a switching signal to control the switch-shaping circuit. The running modes comprise a lock-in mode and a non-lock-in mode. When the output voltage is between an upper voltage limit and a lower voltage limit, the operating mode is in the lock-in mode. Otherwise, the operating mode is in the non-lock-in mode.

According to one embodiment of this invention, the switch-shaping circuit furthermore comprises an inductor, a switching device, a diode and a capacitor. The inductor and the capacitor together shape and filter the input voltage to produce the desired output voltage. The switching device is coupled to the control device and the inductor. According to the switching signal transmitted from the control device, the switching device is turned on or off. The diode is coupled to the inductor to prevent an inversion of current flow direction.

According to one embodiment of this invention, the voltage-sensing device comprises an output voltage monitoring device and a lock-in voltage comparator. The output voltage monitoring device is a device for detecting any difference in voltage between the output voltage and the target voltage. The output voltage monitoring device furthermore comprises a third comparator. When the output voltage is still far away from the target voltage, the output voltage monitoring device will issue an out-of-target voltage signal.

The lock-in voltage comparator is a device for determining if the output voltage lies between the upper voltage limit and the lower voltage limit. The lock-in voltage comparator furthermore comprises a first comparator, a second comparator and a logic gate. The first comparator will issue an exceed-upper-voltage-limit signal when the first comparator detects that the output voltage is higher than the upper voltage limit. Similarly, the second comparator will issue a below-lower-voltage-limit signal when the second comparator detects that the output voltage is lower than the lower voltage limit. The logic gate is coupled to the first comparator and the second comparator. According to the output signals from the first comparator and the second comparator, the logic gate outputs a lock-in voltage range signal.

According to one embodiment of this invention, the panel of sensing signals picked up by the control device furthermore includes the out-of-target voltage signal, the exceed-upper-voltage-limit signal, the below-lower-voltage-limit signal and the lock-in voltage range signal. The control device furthermore comprises an up/down counter, a counter, a digital comparator and a switch-controlling device.

The up/down counter is coupled to the voltage-sensing device. The up/down counter performs a counting operation in one direction according to the exceed-upper-voltage-limit signal and performs a counting operation in another direction according to the below-lower-voltage limit signal. The counter receives a clocking signal and performs a cyclic counting operation. The digital comparator is coupled to the up/down counter and the counter so that the value produced by the up/down counter and the counter can be compared. When the two output values are identical, the digital comparator outputs an equal signal. The switch-controlling device is coupled to the digital comparator, the logic gate of the lock-in voltage comparator and the third comparator of the output voltage monitoring device. If the switch-controlling device receives the equal signal from the digital comparator, the switch-controlling device will issue a switching signal to turn off the switching device. On the contrary, if the switch-controlling device receives both the out-of-target signal and the lock-in voltage range signal at the same time, the switch-controlling device will issue a switching signal to turn on the switching device.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
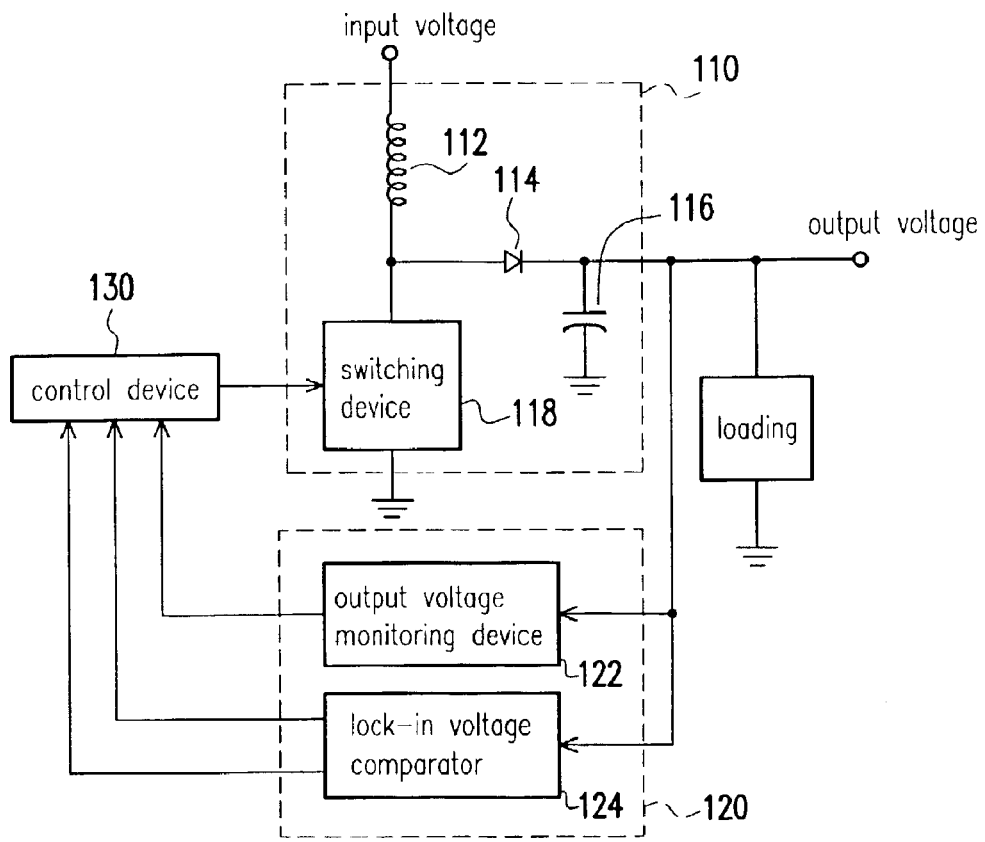
FIG. 1 is a block diagram showing the circuit layout of a direct voltage/direct voltage converter according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing the circuit layout of a direct voltage/direct voltage converter according to one preferred embodiment of this invention. The direct voltage/direct voltage converter 100 comprises a switch-shaping circuit 110, a voltage-sensing device 120 and a control device 130. The switch-shaping circuit 110 has a switch for receiving an input voltage and thereafter shaping and filtering it to produce an output voltage. The voltage-sensing device 120 measures the output voltage from the switch-shaping circuit 110 and outputs a sensing signal. The control device 130 is coupled to the switch-shaping circuit 110 and the voltage-sensing device 120. The control device 130 provides a number of running modes. According to the sensing signal from the voltage-sensing device 120, the control device 130 chooses a current operating mode among the running modes. Thereafter, the control device 130 issues a switching signal to control the switch-shaping circuit 110 according to the current operating mode.

As shown in FIG. 1, the switch-shaping circuit 110 furthermore comprises an inductor 112, a diode 114, a capacitor 116 and a switching device 118. The inductor 112 shapes the input voltage to produce an output voltage. In this invention, the direct voltage/direct voltage converter is only mildly sensitive to the variation in the inductance value and hence little affected by the quality of the inductor 112. The switching device 118 is coupled to the control device 130 and the inductor 112. According to the switching signal transmitted from the control device 130, the switching device 118 is switched on or off. The diode 114 is coupled to the inductor 112 to prevent an inversion of power. The capacitor 116 is coupled to the diode 114 and a ground. The capacitor 116 serves as a device for producing an output voltage after filtering the input voltage.

In FIG. 1, the voltage-sensing device 120 furthermore comprises an output voltage monitoring device 122 and a lock-in voltage comparator 124. The output voltage monitoring device 122 measures the difference between the output voltage and a target voltage and the lock-in voltage comparator 124 determines if the output voltage is located somewhere between an upper voltage limit and a lower voltage limit.

Figure 2A:
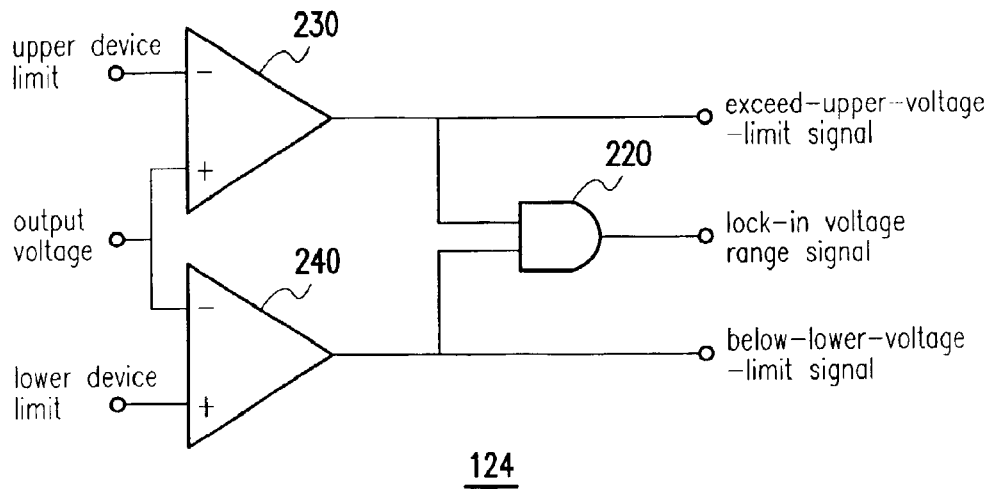
FIG. 2A is a diagram showing the circuit layout of a lock-in voltage comparator inside a direct voltage/direct voltage converter according to one preferred embodiment of this invention.

FIG. 2A is a diagram showing the circuit layout of a lock-in voltage comparator inside a direct voltage/direct voltage converter according to one preferred embodiment of this invention. The lock-in voltage comparator 124 comprises a first comparator 230, a second comparator 240 and a logic gate 220. The first comparator 230 refers the output voltage to an upper voltage. If the output voltage exceeds the upper voltage, the first comparator 230 issues an exceed-upper-voltage-limit signal. The second comparator 240 refers the output voltage to a lower voltage. If the output voltage is smaller than the lower voltage, the second comparator 240 issues a below-lower-voltage-limit signal. The two input terminals of the logic gate 220 are coupled to the output terminal of the first comparator 230 and the second comparator 240 respectively. According to the output signal from the first comparator 230 and the second comparator 240, the logic gate 220 outputs a lock-in voltage range signal. In the embodiment of this invention, the logic gate 220 is an AND gate.

Figure 2B:
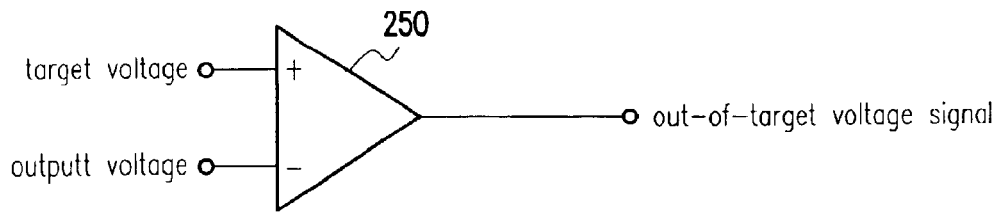
FIG. 2B is a diagram showing the circuit layout of an output voltage monitoring device inside the direct voltage/direct voltage converter according to one preferred embodiment of this invention.

FIG. 2B is a diagram showing the circuit layout of an output voltage monitoring device inside the direct voltage/direct voltage converter according to one preferred embodiment of this invention. The output voltage monitoring device 122 comprises a third comparator 250. The comparator 250 outputs an out-of-target voltage signal when the output voltage has not yet reached the target voltage.

In brief, the panel of sensing signals from the voltage-sensing device 120 includes but is not limited to the out-of-target voltage signal, the exceed-upper-voltage-limit signal, the below-lower-voltage limit signal and the lock-in voltage range signal.

Figure 3:
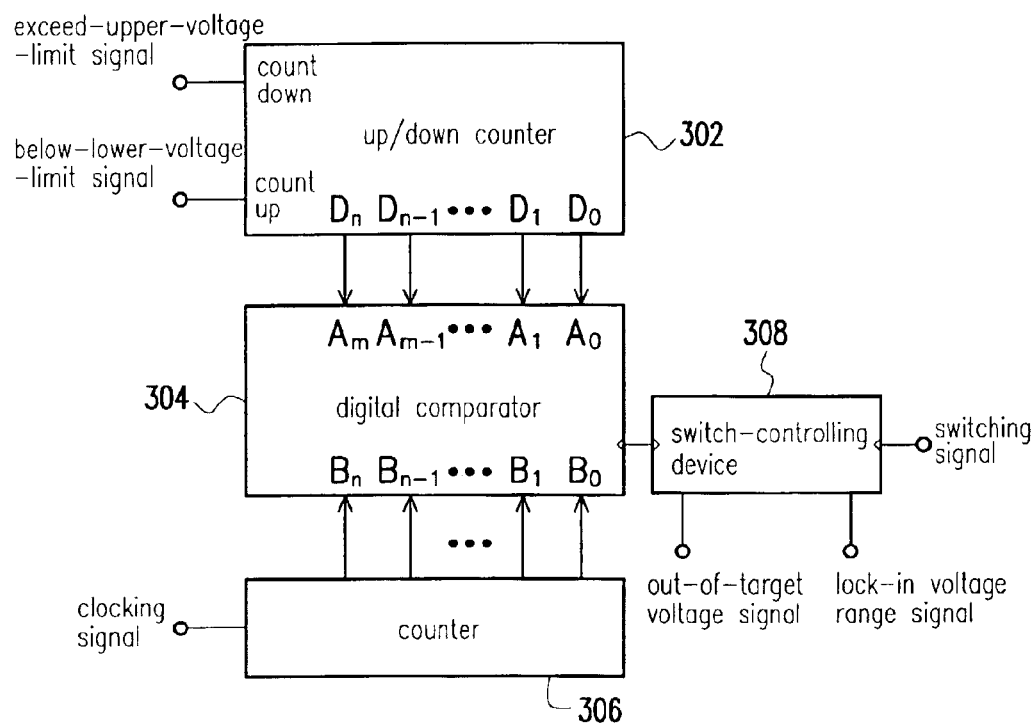
FIG. 3 is a block diagram showing the circuit layout of a control device inside a direct voltage/direct voltage converter according to one preferred embodiment of this invention.

FIG. 3 is a block diagram showing the circuit layout of a control device inside a direct voltage/direct voltage converter according to one preferred embodiment of this invention. As shown in FIG. 3, the control device 130 comprises an up/down counter 302, a digital comparator 304, a counter 306 and a switch-controlling device 308.

The up/down counter 302 is coupled to the voltage-sensing device 120. The up/down counter 302 counts down if the up/down counter receives an exceed-upper-voltage-limit signal from the voltage-sensing device 120 but counts up if the up/down counter receives a below-lower-voltage-limit signal from the voltage sensing device 120. The counter 306 receives a clocking signal and performs a cyclic counting procedure. The digital comparator 304 is coupled to the up/down counter 302 and the counter 306. The digital comparator 304 monitors the output value of both the up/down counter 302 and the counter 306. When the two output values are identical, the digital comparator 340 issues an equivalent signal. The switch-controlling device 308 is coupled to the digital comparator 304, the third comparator 250 of the output voltage monitoring device 122 and the logic gate 220 of the lock-in voltage comparator 124. On receiving the equivalent signal transmitted from the digital comparator 304, the switch-controlling device 308 will output a switch signal to cut off the switching device 118. On the other hand, if the switch-controlling device 308 receives both the lock-in voltage range signal and the out-of-target voltage signal, the switch-controlling device 308 will output a switch signal to turn on the switching device 118.

Figure 4:
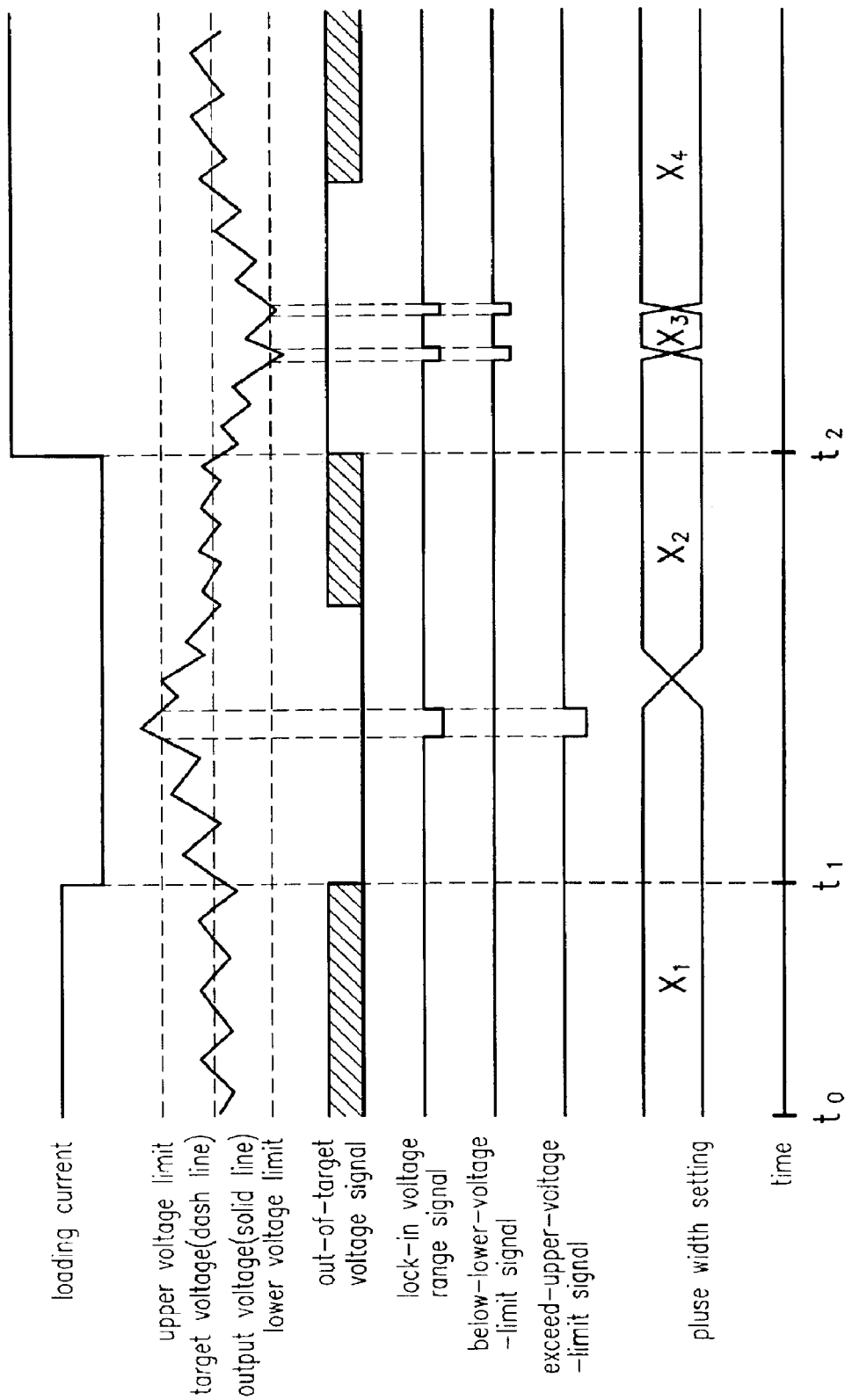
FIG. 4 is a diagram showing the time trace of various signals within the direct voltage/direct voltage converter according to this invention during a normal operation.
Figure 5:
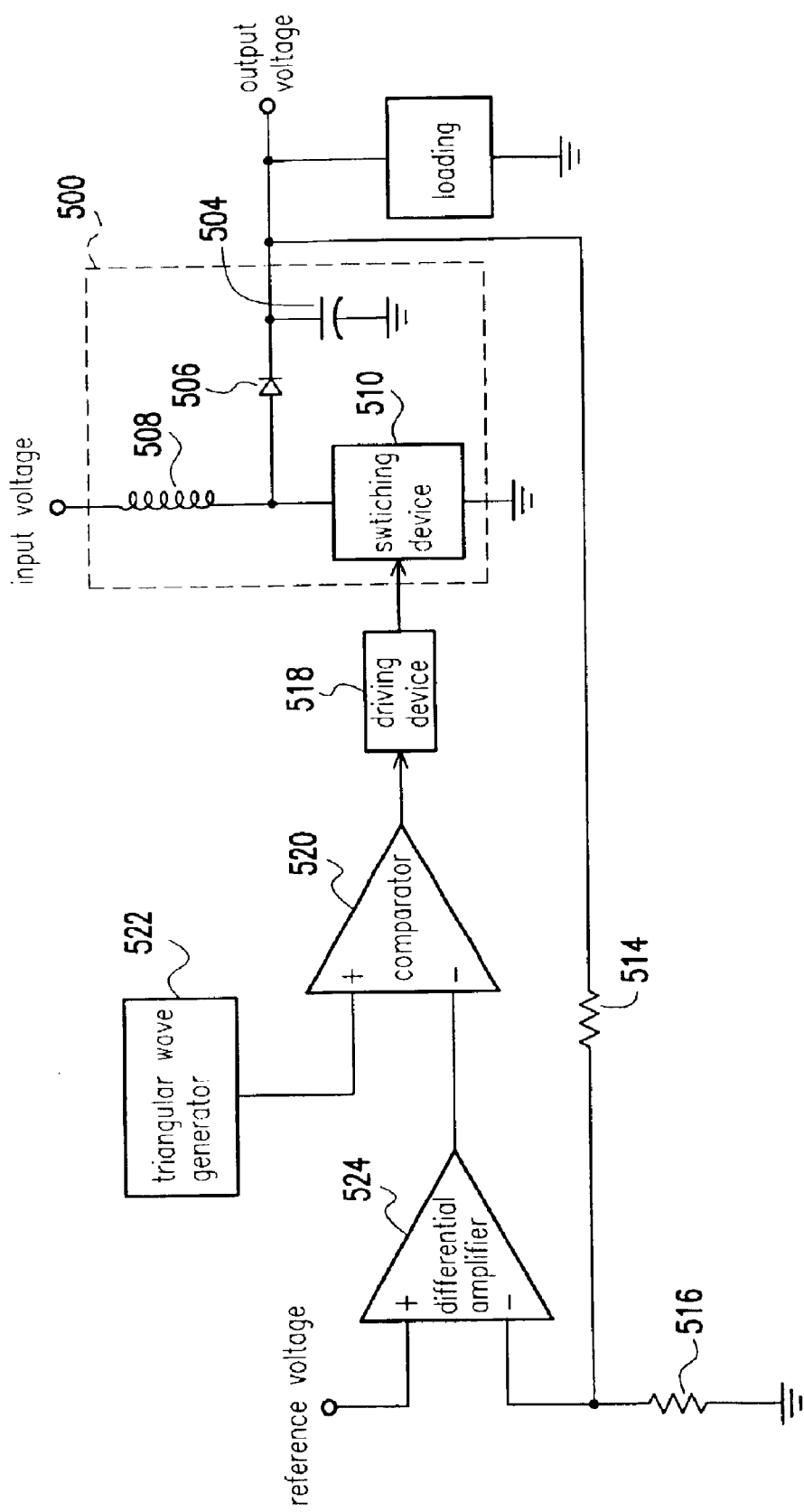
FIG. 5 is a circuit diagram of a conventional voltage mode pulse width modulation (PWM) direct voltage/direct voltage converter.
Figure 6:
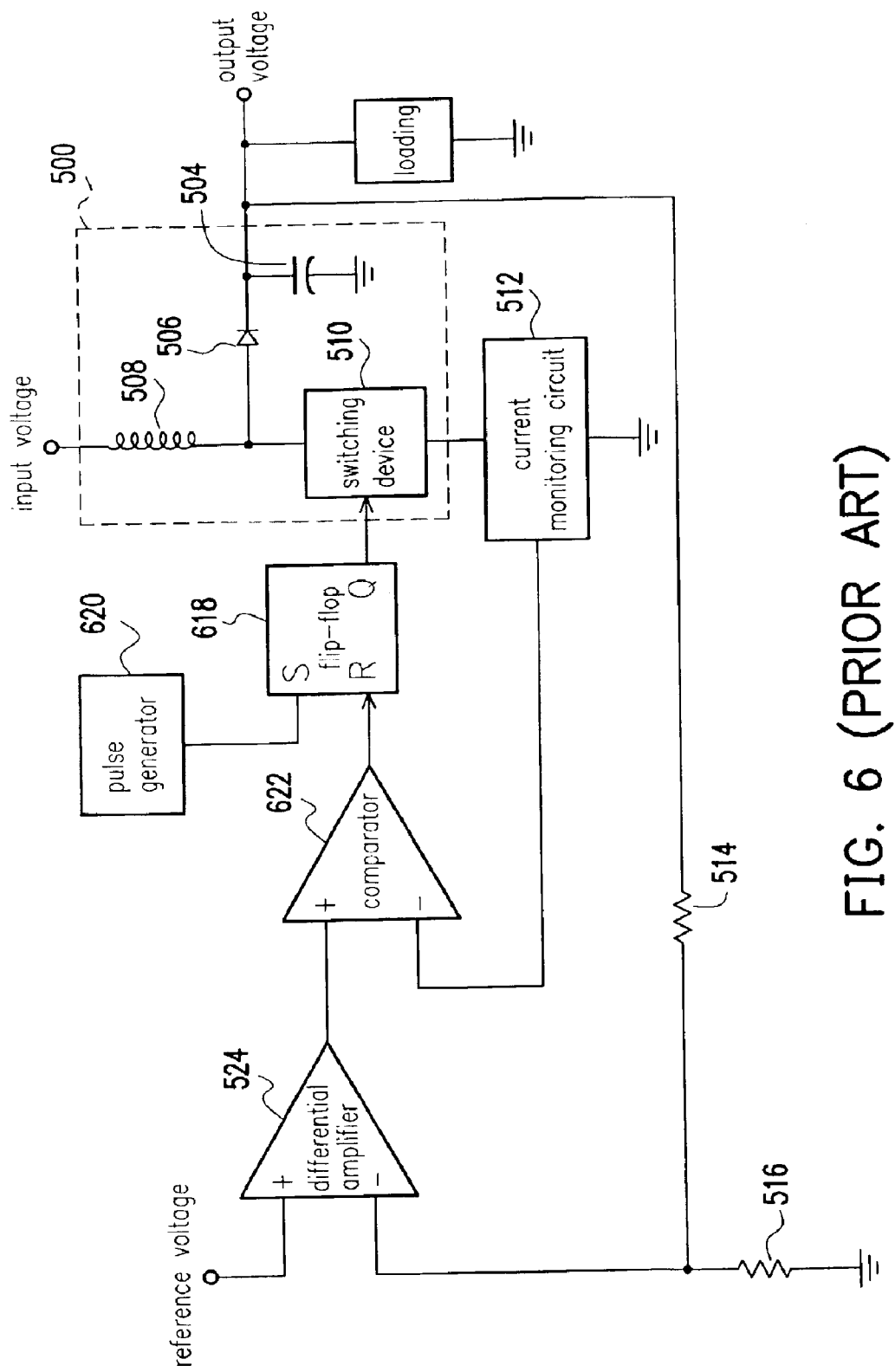
FIG. 6 is a circuit diagram of a conventional current mode pulse width modulation (PWM) direct voltage/direct voltage converter.
Figure 7:
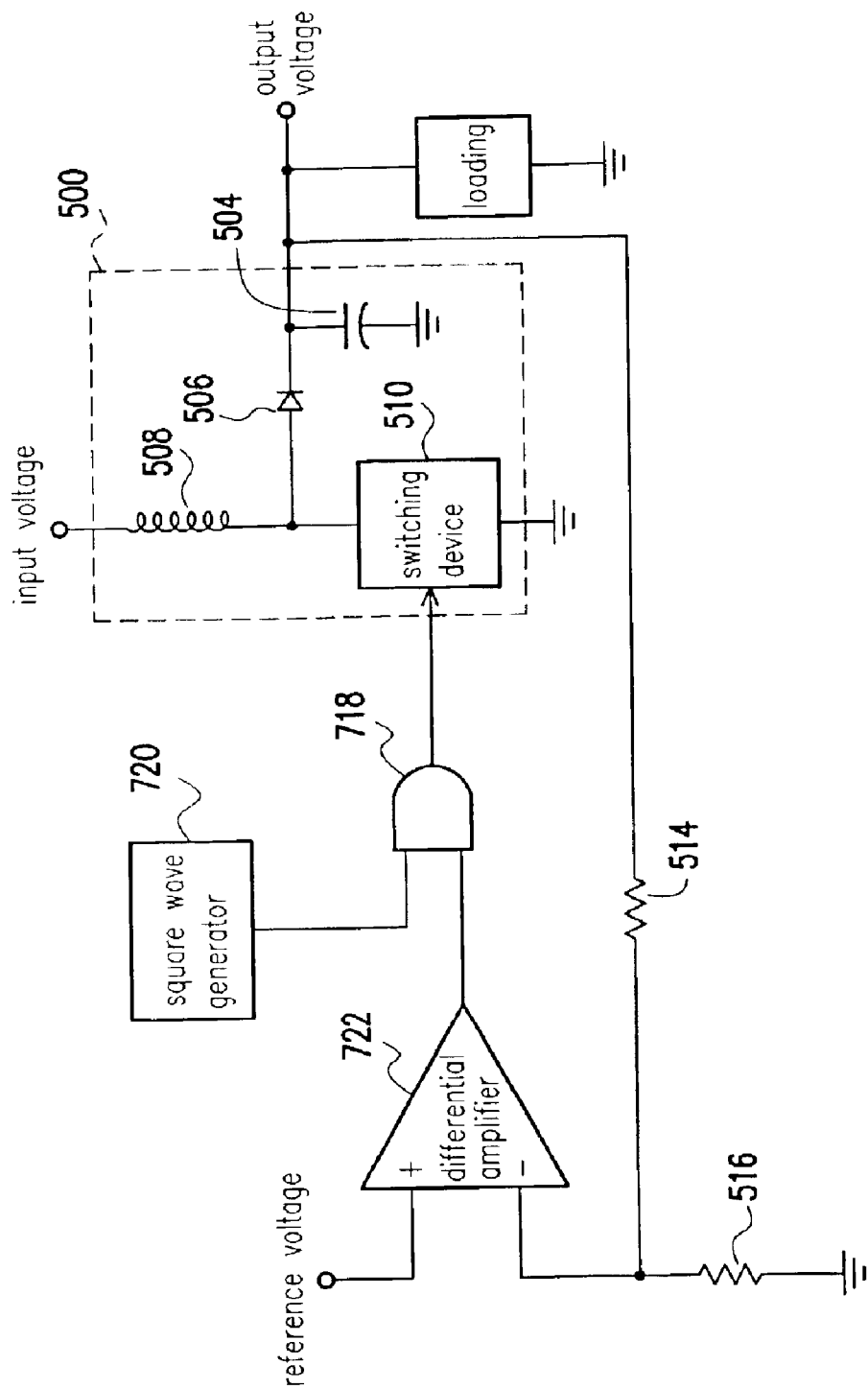
FIG. 7 is a circuit diagram of a conventional clock pulse frequency modulation (PFM) direct voltage/direct voltage converter.
Figure 8:
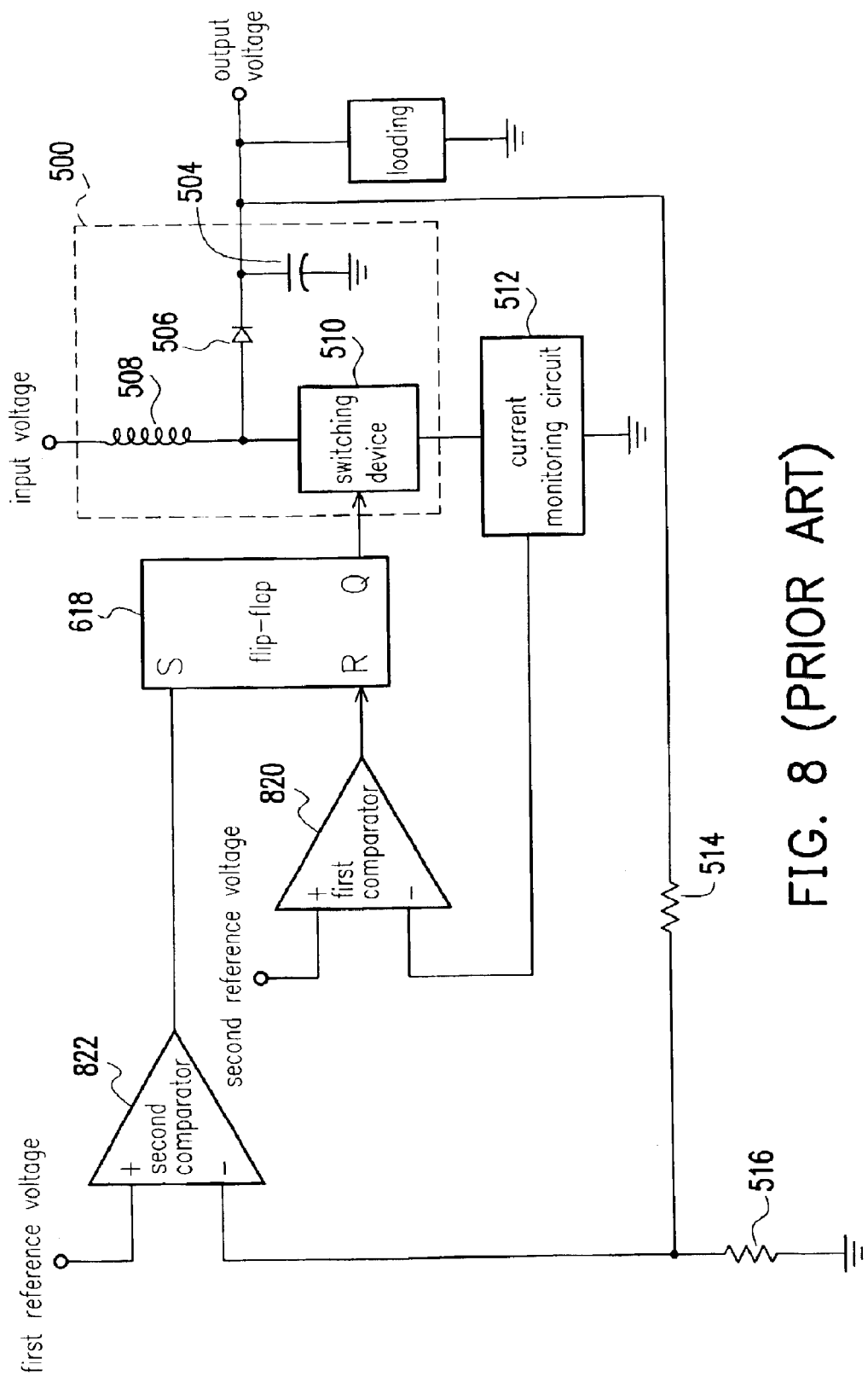
FIG. 8 is a circuit diagram of a conventional current-limiting pulse frequency modulation (PFM) direct voltage/direct voltage converter.

FIG. 4 is a diagram showing the time trace of various signals within the direct voltage/direct voltage converter according to this invention during a normal operation. At time t0, the converter starts out in the lock-in operating mode. At this stage, the pulse width is set to X1 and the output voltage (solid line) lies somewhere between the upper voltage (dash line) and the lower voltage (dash line). At time t1, there is a steady upward drift of the output voltage due to a drop in the loading current. When the output voltage exceeds the upper voltage limit, the first comparator 230 outputs an exceed-upper-voltage-limit signal to the up/down counter 302 so that the up/down counter 302 starts to count down and the pulse width is lowered to X2. Thereafter, the output voltage resides in a stable lock-in mode.

At time t2, there is a steady downward drift of the output voltage due to an increase in the loading current. When the output voltage drops below the lower voltage limit, the second comparator 240 outputs a below-lower-voltage-limit signal to the up/down counter 302 so that the up/down counter 302 starts to count up and the pulse width is raised to X3. However, at a pulse width of X3, there is still no way to keep the output voltage at the lock-in mode. Hence, the second comparator 240 generates an additional up-count pulse to raise the pulse width to X4. In the aforementioned description, the pulse width X2<the pulse width X1 and the pulse width X4>the pulse width X3>the pulse width X2.

In the embodiment of this invention, the available running modes in the control device 130 include a lock-in mode and a non-lock-in mode. According to the sensing signals, the control device 130 sets up the converter to operate in the lock-in mode when the output voltage lies between the upper voltage and the lower voltage and sets up the converter to operate in the non-lock-in mode otherwise.

In the embodiment of this invention, the switching device 118 is a digitally controlled device capable of providing different pulse width signals (running modes) to the switch-shaping circuit 110 so that a fixed pulse width is used when the operating mode is stable. The digitally controlled device can be a micro-controller, a microprocessor or a finite state machine, but is not limited as such.

In summary, the direct voltage/direct voltage converter according to this invention has the following advantages:

1. Pulse width of the converter can be dynamically adjusted according to loading variation. Hence, the output voltage contains very little ripples.

2. The converter according to this invention is able to reduce the deviation of output voltage from target voltage in conventional voltage mode pulse width modulated converters and current mode pulse width modulated converters.

3. The direct voltage/direct voltage converter of this invention has a simple structure with properties less sensitive to process variation.

4. Since the variation of output voltage is utilized to simulate the effects produced by current sensors, power consumption of the converter is low.

5. The converter is only mildly sensitive to any variation in the inductance value and hence a super high quality inductor is not required. In other words, production cost can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A direct voltage/direct voltage converter, comprising:
   a switch-shaping circuit for receiving an input voltage by turning on a switch and then shaping and filtering the input voltage to produce an output voltage based on a current operating mode selected from a plurality of running modes;
   a voltage-sensing device for measuring the input voltage and outputting a sensing signal; and
   a control device coupled to the voltage-sensing device and the switch-shaping circuit, wherein the control device provides the plurality of running modes such that the control device chooses one among the running modes to serve as the current operating mode according to the sensing signal, and according to the current operating mode, the control device outputs a switching signal for controlling the switch-shaping circuit.

2. The converter of claim 1, wherein the voltage-sensing device furthermore comprises:
   an output voltage monitoring device for referring the output voltage to a target voltage; and
   a lock-in voltage comparator for determining if the output voltage lies between an upper voltage limit and a lower voltage limit or not.

3. The converter of claim 2, wherein the lock-in voltage comparator furthermore comprises:
   a first comparator for referring the output voltage to the upper voltage limit such that an exceed-upper-voltage-limit signal is issued when the output voltage is greater than the upper voltage limit;
   a second comparator for referring the output voltage to the lower voltage limit such that a below-lower-voltage-limit signal is issued when the output voltage is lower than the lower voltage limit; and
   a logic gate coupled to the first comparator and the second comparator for outputting a lock-in voltage range signal according to the output signals from the first comparator and the second comparator.

4. The converter of claim 2, wherein the output voltage monitoring device furthermore comprises a third comparator for referring the output voltage to the target voltage such that the third comparator issues an out-of-target voltage signal when the output voltage is outside an acceptable limit of the target voltage.

5. The converter of claim 1, wherein the running modes include a lock-in mode and a non-lock-in mode and, according to the sensing signal, the control device sets the operating mode of the converter to the lock-in mode when the output voltage is between an upper voltage limit and a lower voltage limit and sets the operating mode of the converter to the non-lock-in mode otherwise.

6. The converter of claim 5, wherein the panel of sensing signals includes an out-of-target voltage signal, an exceed-upper-voltage-limit signal, a below-lower-voltage-limit signal and a lock-in voltage range signal, and the control device furthermore comprises:
   an up/down counter coupled to the voltage-sensing device for counting in one direction on receiving the exceed-upper-voltage-limit signal and counting in another direction on receiving the below-lower-voltage-limit signal;
   a counter for receiving a clocking signal and performing a cyclic counting procedure;
   a digital comparator coupled to the up/down counter and the counter for monitoring the output value of both the up/down counter and the counter and outputting an equivalent signal when the output value from the up/down counter and the counter are identical; and
   a switch-controlling device coupled to the digital comparator, the logic gate of the lock-in voltage comparator and the third comparator of the output voltage monitoring device such that the switch-controlling device outputs a switch signal to cut off the switching device when the switch-controlling device picks up an equivalent signal and the switch-controlling device outputs a switch signal to turn on the switching device when the switch-controlling device picks up a lock-in voltage range signal and an out-of-target voltage signal at the same time.

7. The converter of claim 1, wherein the control device includes a digital controller for providing signals that represent different pulse widths to the switch-shaping circuit so that the pulse width is fixed when the operating mode is stable.

8. The converter of claim 7, wherein the digital controller includes a micro-controller.

9. The converter of claim 7, wherein the digital controller includes a microprocessor.

10. The converter of claim 7, wherein the digital controller includes a finite state machine.

11. The converter of claim 1, wherein the switch-shaping circuit furthermore comprises:
   an inductor for rectifying the input voltage to produce an output voltage;
   a switching device coupled to the control device and the inductor for determining whether to switch on or to switch off the switching device according to the switching signals transmitted from the control device;
   a diode coupled to the inductor for preventing an inversion of the output voltage; and
   a capacitor coupled to the diode and a ground for filtering the output voltage.

12. A direct voltage/direct voltage converter, comprising:

a switch-shaping circuit for receiving an input voltage by turning on a switch and then shaping and filtering the input voltage to produce an output voltage;

a voltage-sensing device for measuring the input voltage and outputting a sensing signal; and a control device coupled to the voltage-sensing device and the switch-shaping circuit, wherein the control device provides a plurality of running modes such that the control device chooses one among the running modes to serve as a current operating mode according to the sensing signal, and according to the current operating mode, the control device outputs a switching signal for controlling the switch-shaping circuit;

wherein the running modes include a lock-in made and a non-lock-in mode and, according to the sensing signal, the control device acts the operating mode of the converter to the lock-in mode when the output voltage is between an upper voltage limit and a lower voltage limit and sets the operating mode of the converter to the non-lock-in mode otherwise; and wherein the panel of sensing signals includes an out-of-target voltage signal, an exceed-upper-voltage-limit signal, a below-lower-voltage-limit signal and a lock-in voltage range signal, and the control device furthermore comprises:

an up/down counter coupled to the voltage-sensing device for counting in one direction on receiving the exceed-upper-voltage-limit signal and counting in another direction on receiving the below-lower-voltage-limit signal;

a counter for receiving a clocking signal and performing a cyclic counting procedure;

a digital comparator coupled to the up/down counter and the counter for monitoring the output value of both the up/down counter and the counter and outputting an equivalent signal when the output value from the up/down counter and the counter are identical; and a switch-controlling device coupled to the digital comparator, the logic gate of the lock-in voltage comparator and the third comparator of the output voltage monitoring device such that the switch-controlling device outputs a switch signal to cut off the switching device when the switch-controlling device picks up an equivalent signal and the switch-controlling device outputs a switch signal to turn on the switching device when the switch-controlling device picks up a lock-in voltage range signal and an out-of-target voltage signal at the same time.

* * * * *